Dec. 26, 1939.   A. W. MALL   2,184,461
CHAIN SAW CONSTRUCTION
Filed Oct. 4, 1937   10 Sheets-Sheet 1
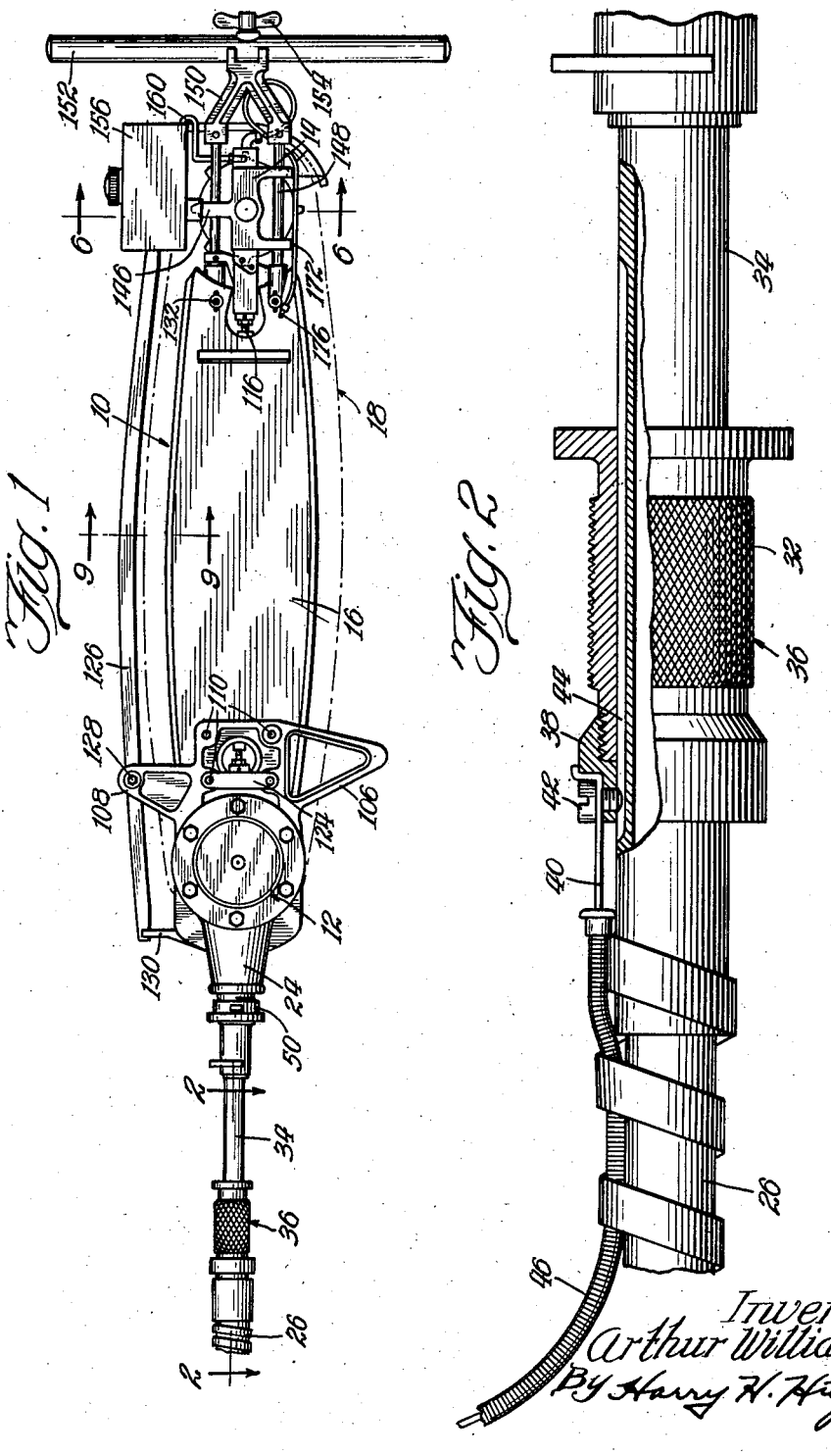

Dec. 26, 1939.                A. W. MALL                    2,184,461
                        CHAIN SAW CONSTRUCTION
                 Filed Oct. 4, 1937         10 Sheets-Sheet 2

Inventor:
Arthur William Mall
BY: Harry H. Hitzeman
         Atty.

Dec. 26, 1939.　　　A. W. MALL　　　2,184,461
CHAIN SAW CONSTRUCTION
Filed Oct. 4, 1937　　　10 Sheets-Sheet 3
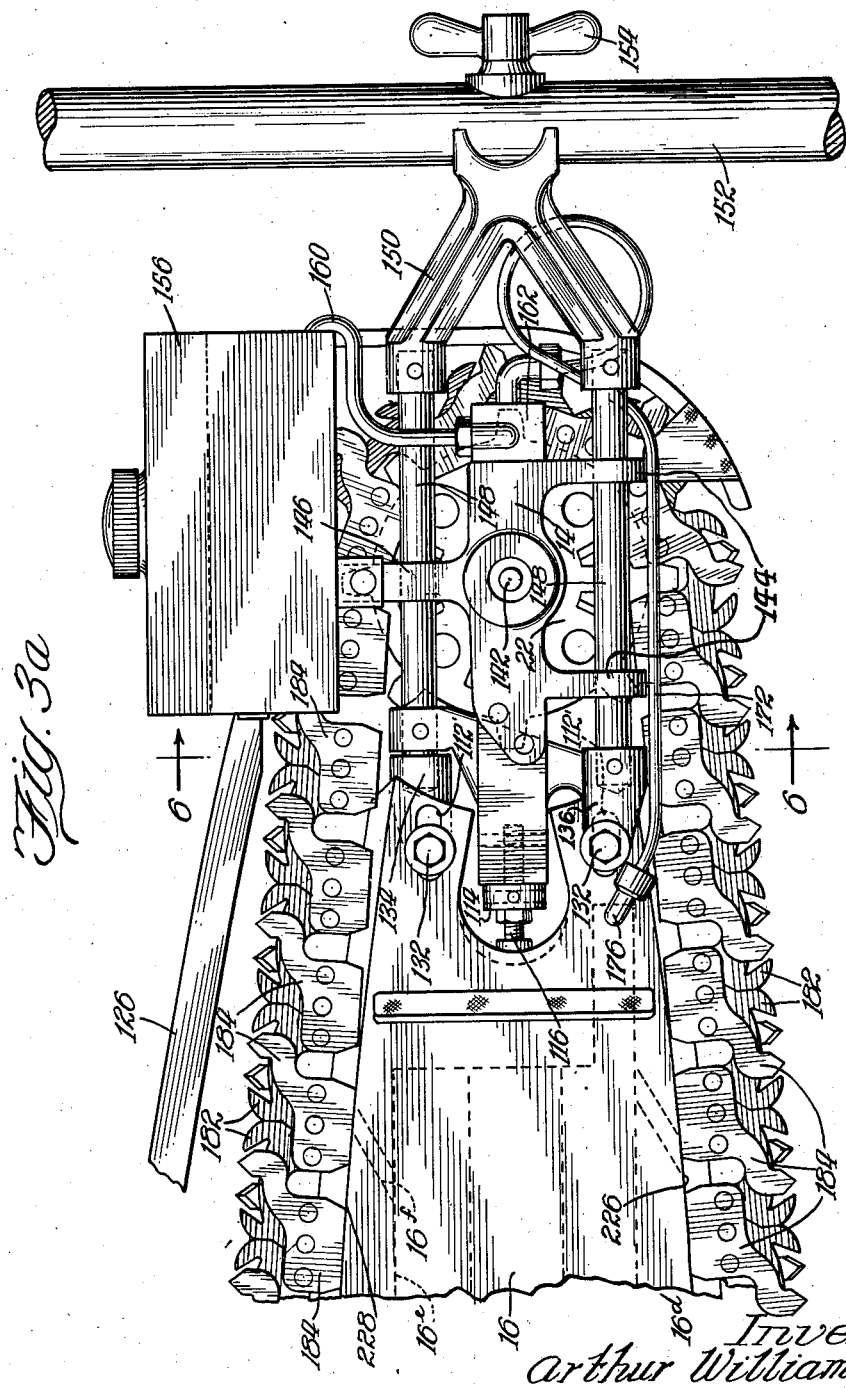
Inventor
Arthur William Mall
By Harry H. Hitzeman
Atty.

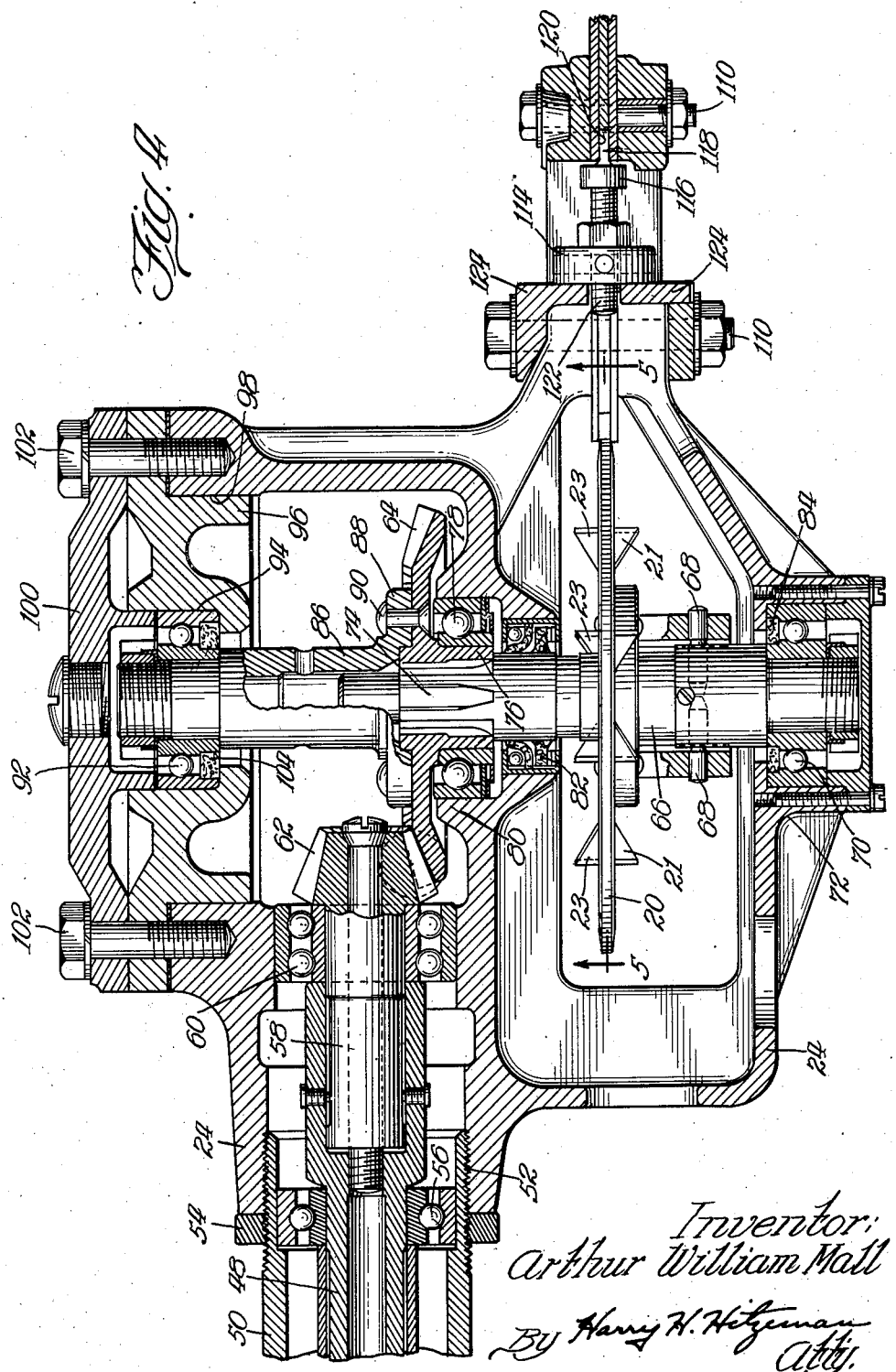

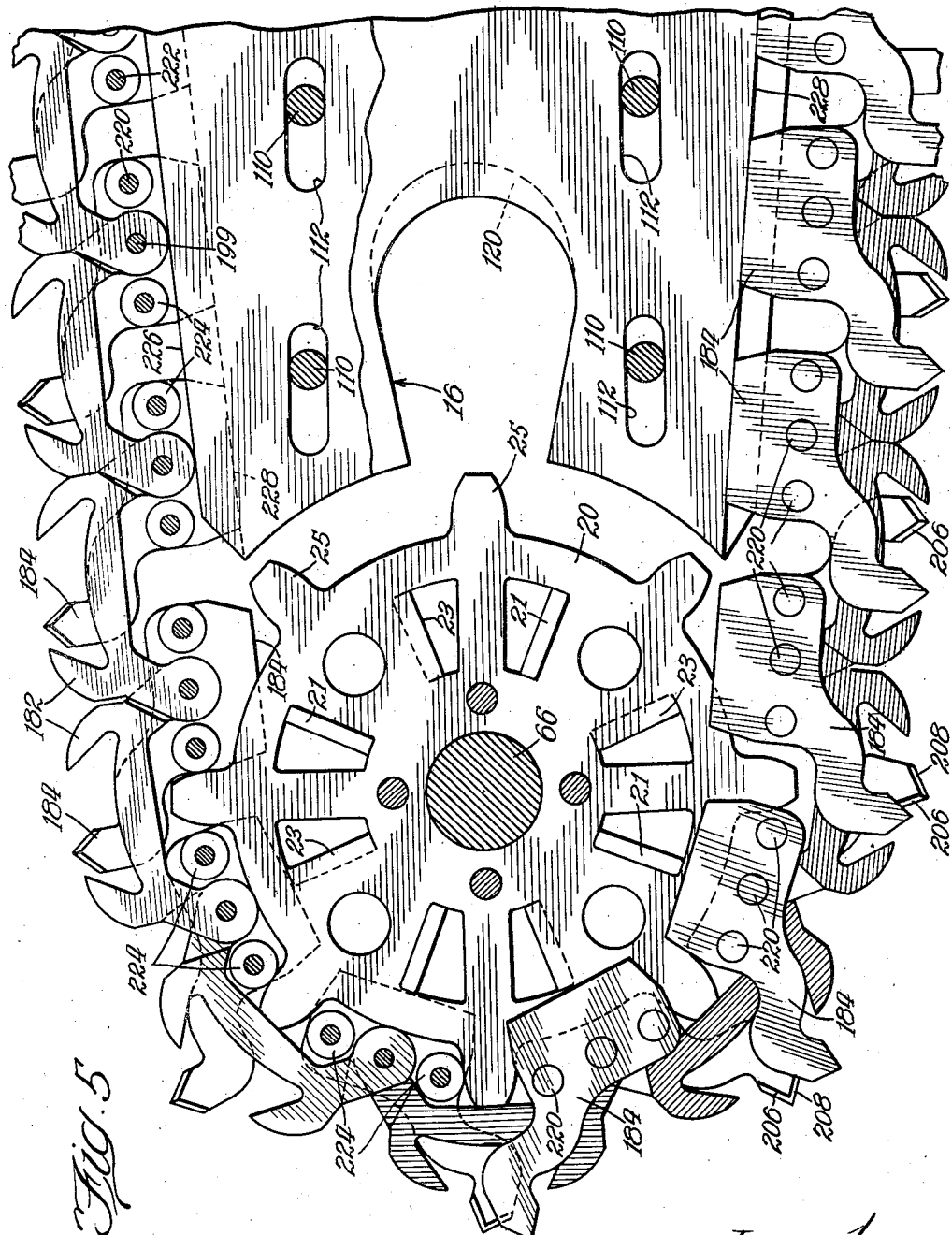

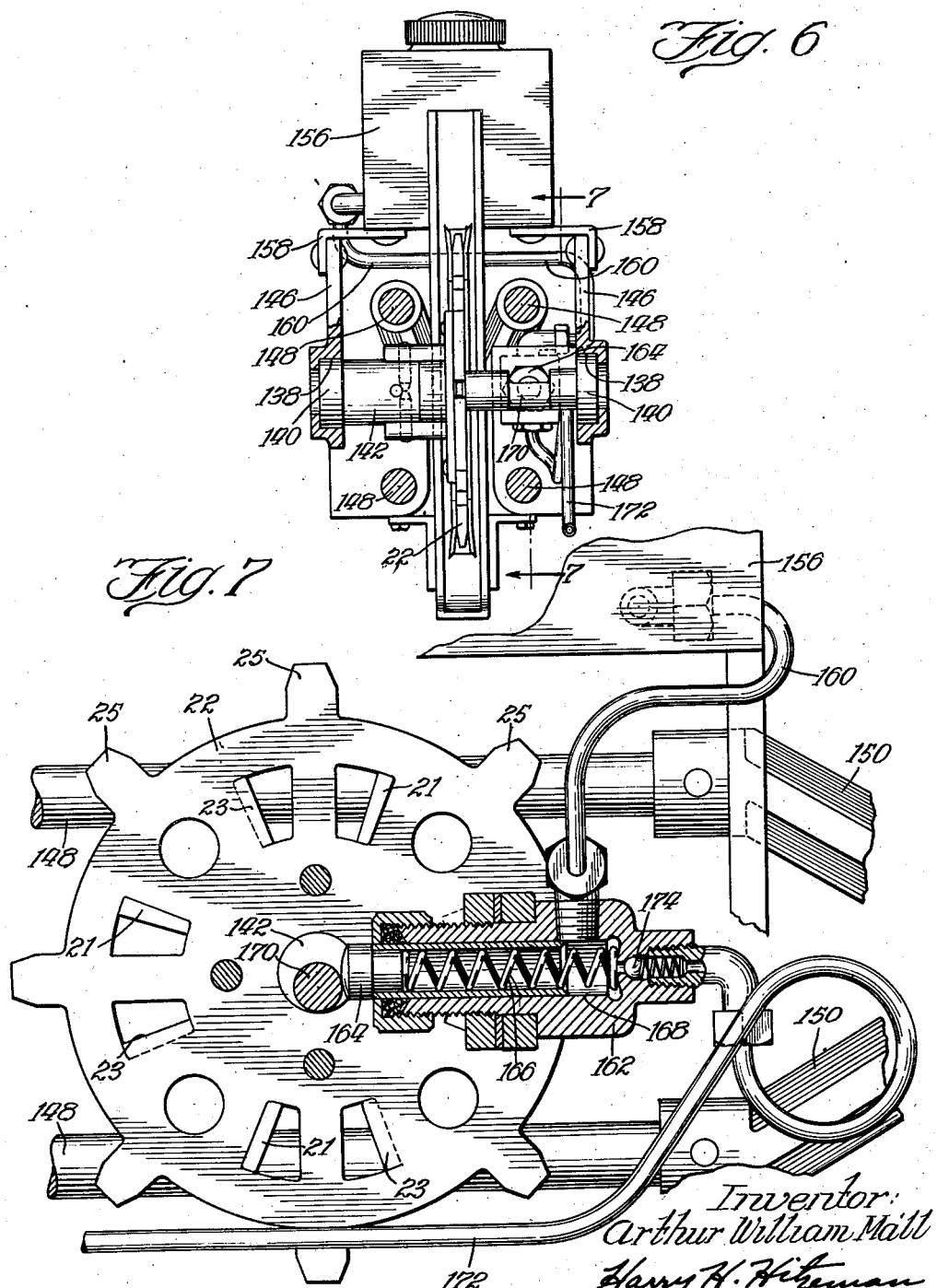

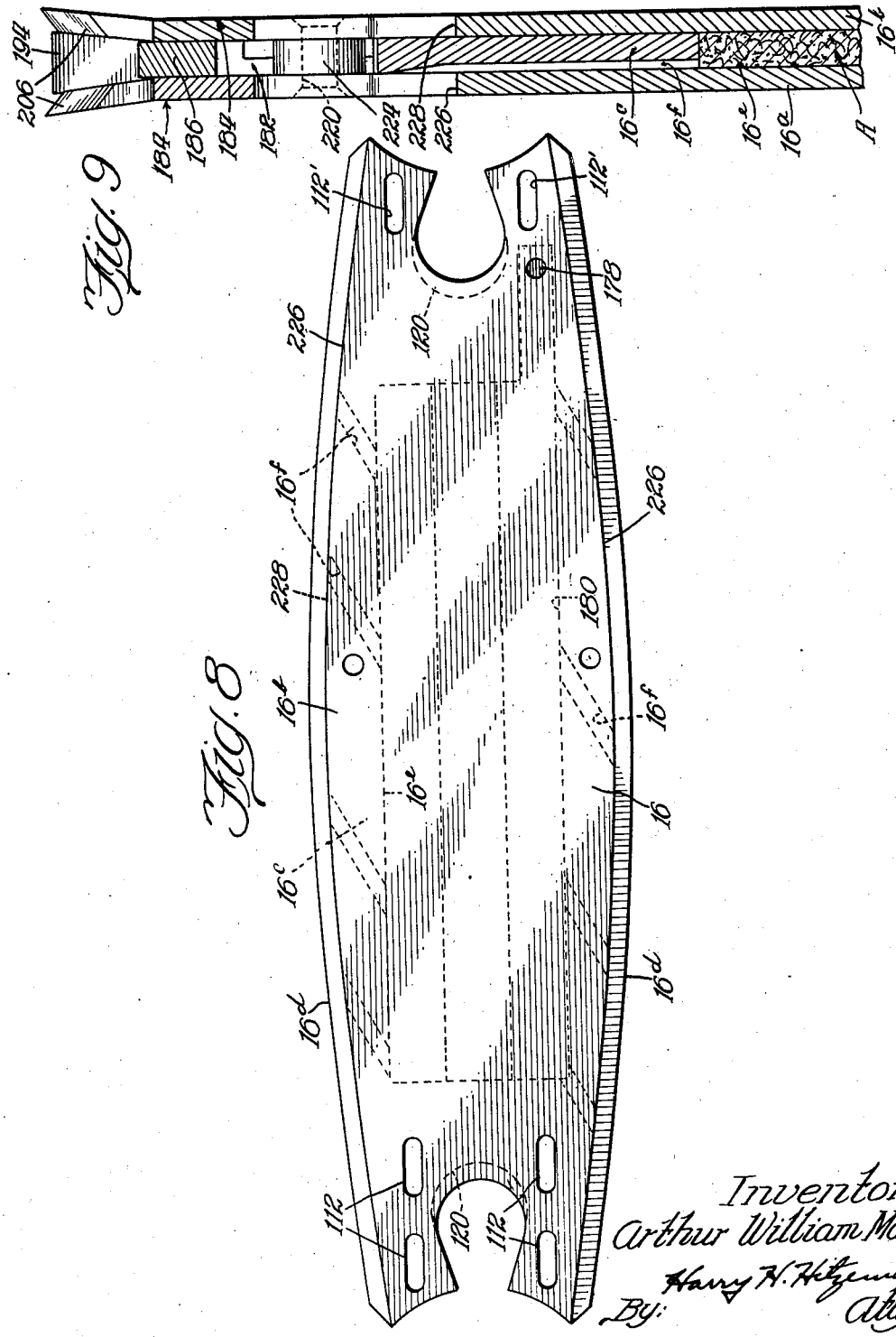

Dec. 26, 1939. A. W. MALL 2,184,461
CHAIN SAW CONSTRUCTION
Filed Oct. 4, 1937 10 Sheets-Sheet 8
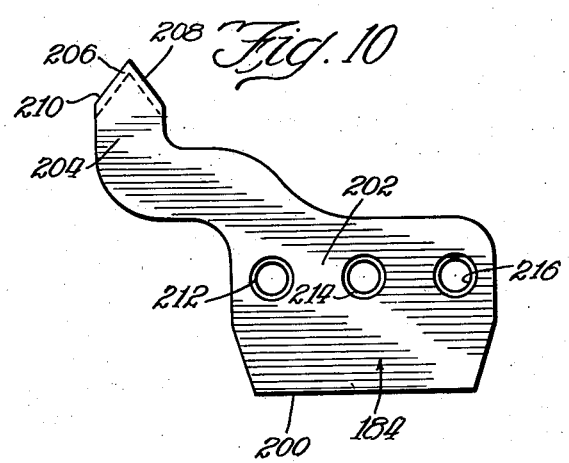
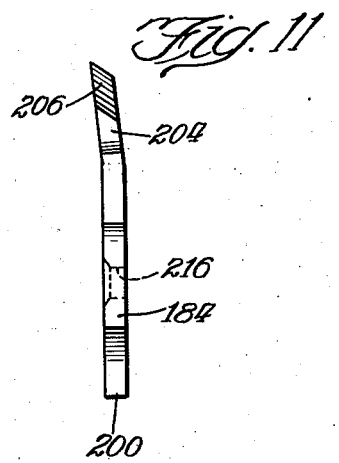
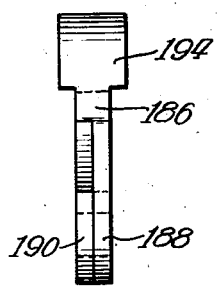
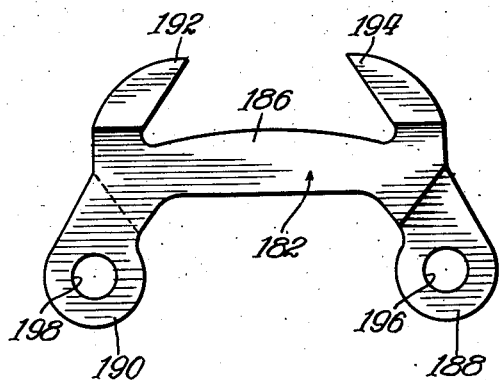
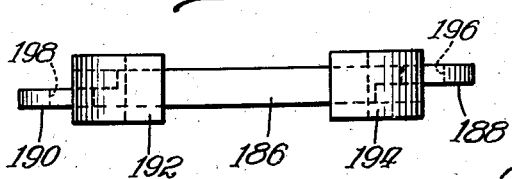
Inventor:
Arthur William Mall
By: Harry H. Hitzeman
Atty.

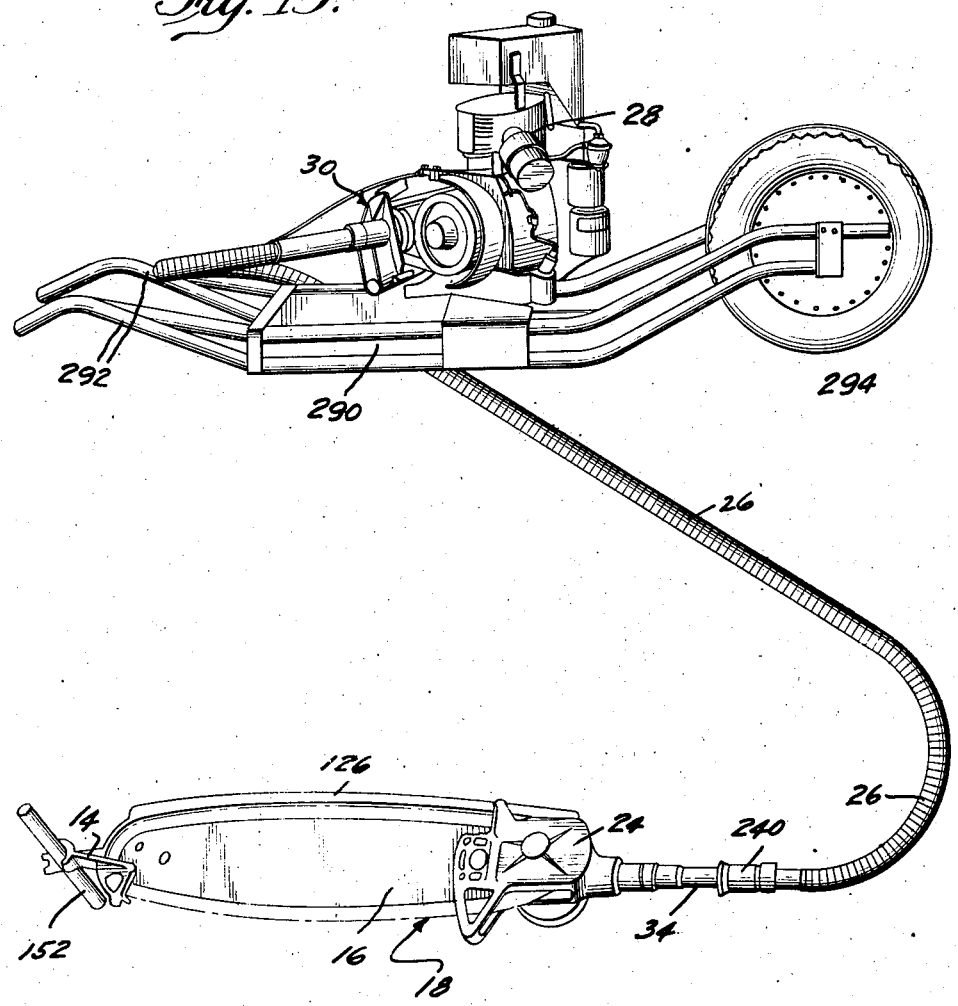

Dec. 26, 1939.   A. W. MALL   2,184,461
CHAIN SAW CONSTRUCTION
Filed Oct. 4, 1937   10 Sheets-Sheet 10
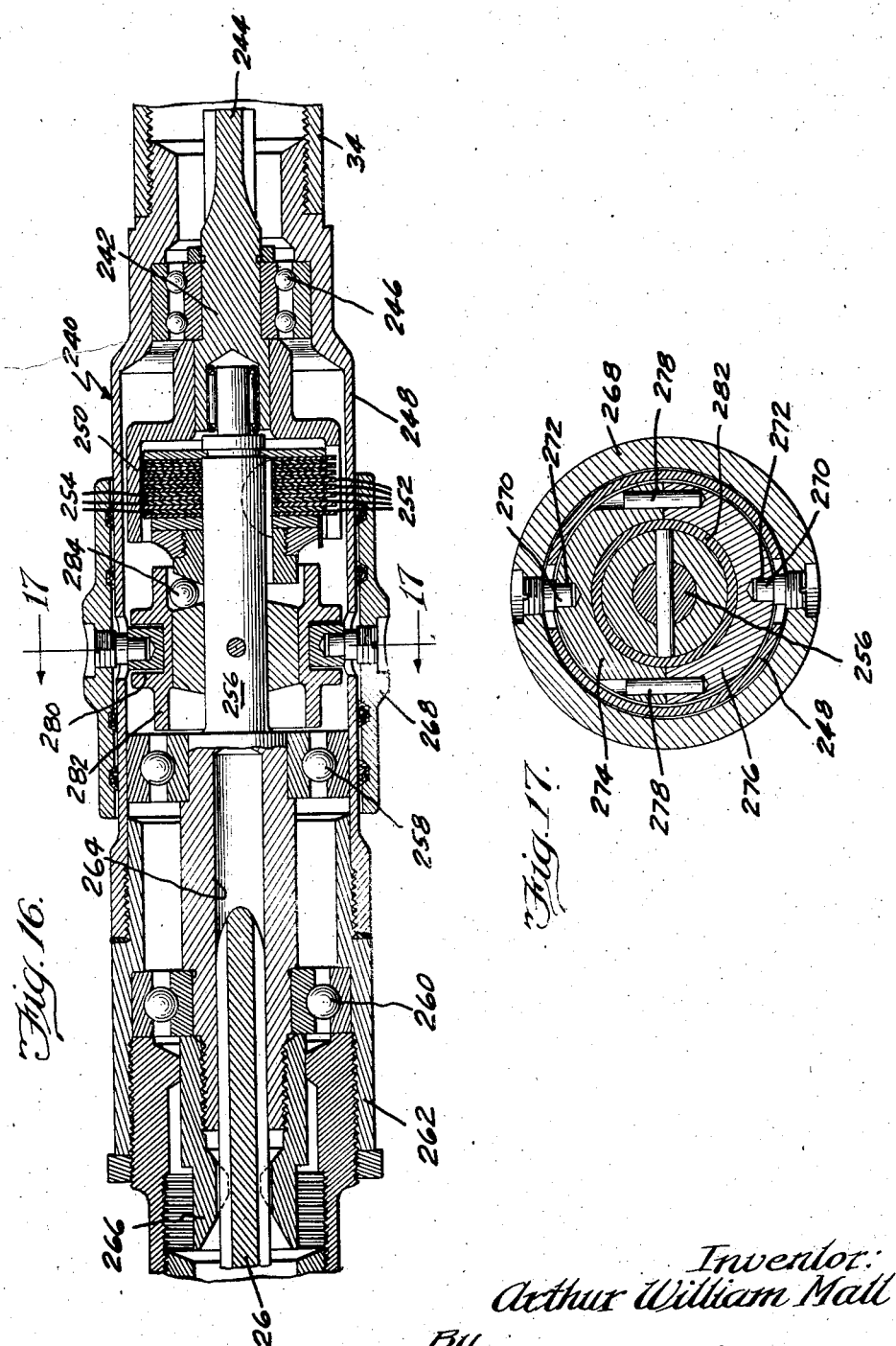
Inventor:
Arthur William Mall
By Harry H. Hitzeman
Atty.

Patented Dec. 26, 1939

2,184,461

UNITED STATES PATENT OFFICE 2,184,461

CHAIN SAW CONSTRUCTION

Arthur William Mall, Chicago, Ill.

Application October 4, 1937, Serial No. 167,301

1 Claim. (Cl. 143—32)

My invention relates to improvements in the construction of chain saws and similar subject matter.

My invention relates more particularly to a portable chain saw of the type which is driven from a remote source of power.

The principal object of the present invention is to provide an improved portable chain saw so constructed that the same may be driven from a remote source of power by a flexible shaft mechanism.

A further object of the invention is to provide improved means associated with the chain saw whereby the speed of the same may be easily controlled from a point adjacent one of the handles of the saw.

A further object of the invention is to provide an improved supporting frame and saw chain linkage so arranged that a minimum of friction is obtained, thereby providing a highly efficient and greatly improved saw construction.

A further object is to provide improved means for increasing the efficiency of the saw, including cooling means associated with the pulleys over which the saw chain is trained and improved positive feed lubricating means associated with the same.

A further object of the invention is to provide a novel and improved lubricating system for mechanism of the type described.

A further object of the invention is to provide a new and improved construction of saw chain including improved side links and drag links so arranged that the same operates with a minimum of friction and the greatest of efficiency.

A further object of the invention is to provide an improved flexible shaft drive and transmission supported adjacent one end of the saw.

A further object is to provide an improved frame having lubricating conduits arranged throughout so that the chain saw links will receive lubrication throughout their travel, thereby greatly increasing the efficiency of the same.

Other objects and advantages will be more apparent from the following description, wherein reference is had to the accompanying ten sheets of drawings, upon which Fig. 1 is a side elevational view of my improved saw construction;

Fig. 2 is an enlarged fragmentary elevational view of the flexible drive connection to the transmission with parts thereof broken away in section to more clearly show other parts;

Figs. 3 and 3A are enlarged fragmentary side elevational views showing the two ends of the saw assembly;

Fig. 4 is an enlarged cross sectional view through the transmission and drive for the saw, taken generally on the lines 4—4 of Fig. 3;

Fig. 5 is a sectional view through the center of the chain saw and the driving sprocket, taken generally on the line 5—5 of Fig. 4;

Fig. 6 is a vertical sectional view through one end of the chain saw support frame and is taken generally on the line 6—6 of Fig. 3A;

Fig. 7 is a fragmentary sectional view showing the oil pump and driving means taken generally on the lines 7—7 of Fig. 6, with the chain saw and frame parts omitted;

Fig. 8 is a side elevational view of the frame guide;

Fig. 9 is a cross sectional view of the same, showing the chain saw trained thereabout and is taken generally on the line 9—9 of Fig. 1;

Fig. 10 is a side elevational view of one of the side links;

Fig. 11 is an end elevational view of the same;

Fig. 12 is a side elevational view of one of the drag links of which the chain saw is constituted;

Fig. 13 is a side elevational view thereof, and

Fig. 14 is a plan view of the drag link.

Fig. 15 is a general assembly view showing a portable gasoline engine, flexible shaft and the portable saw of my invention;

Fig. 16 is a longitudinal sectional view of a clutch element shown at the saw, connected to the flexible shaft; and Fig. 17 is a cross-sectional view thereof taken on the lines 17—17 of Fig. 16.

Figure 3:
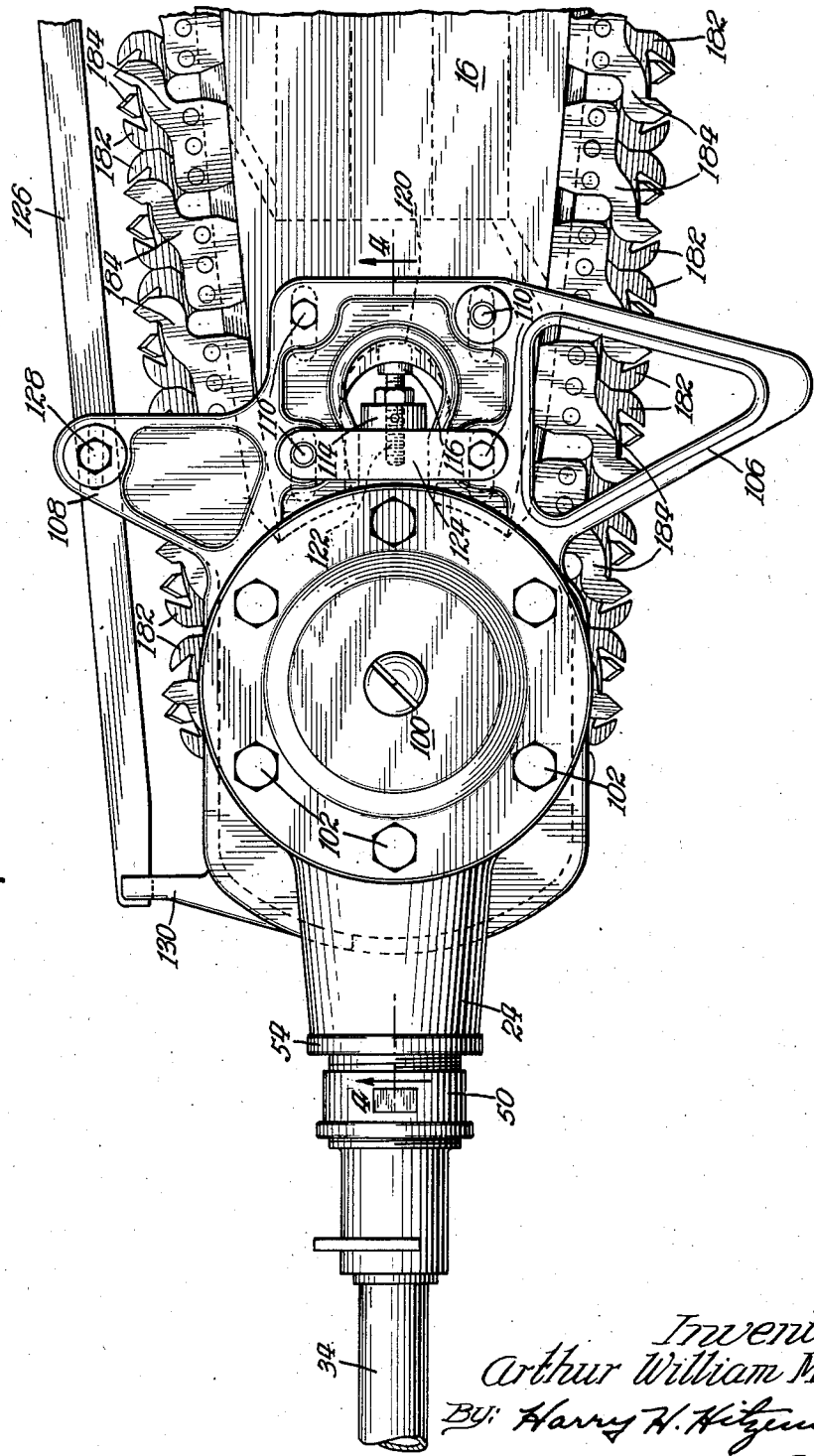

In the embodiment of the invention which I have chosen to illustrate, I have shown in Fig. 1 a portable saw designated generally by the number 10. The portable saw may generally comprise the support brackets 12 and 14, the saw frame 16 which connects the same, and the block chain 18 (shown diagrammatically in Fig. 1), which is trained about a pair of sprockets 20 and 22 mounted in the brackets 12 and 14 respectively. It will be noted in connection with the bracket 12, that I have provided a transmission housing 24 to which a flexible driveshaft 26 is connected. The driveshaft 26 may extend to any suitable source of power, such as the portable gasoline engine 28, to which it may be connected by a suitable centrifugal clutch mechanism 30 at the engine, which is adapted to slip when the load becomes too great or the saw jams, thus cutting out the driving force to the saw and avoiding breakage of the chain saw as well as preventing accidents.

In connection with the drive for the saw, which will be explained later, I provide a speed control for the action of the saw, adapted to be manipulated by one of the operators of the saw. This control may include a throttle handle 32 adapted to be slidably mounted upon a rigid section 34 of the flexible shaft connection to the transmission housing 24. The handle member 32, (see Fig. 2), is provided with a knurled portion 36 for a hand grip, and a collar member 38 to which a comparatively flexible wire 40 may be attached. The wire 40 is secured to the collar by a capscrew 42 which has its end extending downwardly into an elongated slot 44 in the housing 34. The flexible wire 40 is encased in a flexible covering or housing 46 and may lead to the throttle valve of the gasoline engine 28. Thus, when the throttle handle 36 is moved forward it may serve to increase the speed of the engine, thereby accelerating the speed of the saw. Conversely, to reduce the speed of the saw, a backward movement of the handle 32 will reduce the speed of the driving engine 28.

The flexible shaft 26 and its housing, which includes the rigid sleeve member 34, are adapted to be connected to a rigid driveshaft 48 which is mounted in a shell 50 secured in a suitably tapped opening 52 in the transmission housing 24. The shell may be locked in position by a lock nut member 54. The rigid shaft 48 may be mounted in suitable ballbearing members 56 in the shell 50 and extend forward and directly engage a shaft member 58 which is supported in a suitable ballbearing member 60 in the housing 24. A driving pinion 62 may be secured to the end of the shaft 58 and be in driving relation with a bevel gear 64 that is mounted upon a right angle shaft 66. A sprocket 20, previously mentioned, is secured to the driving shaft 66 by means of a shear pin lock mechanism 68 so that under undue strain the drive to the saw will be broken at this point. The shaft 66 thus formed may have one end suitably journalled in the ballbearing members 70 mounted in a journal 72 formed in one portion of the transmission housing 24.

The opposite end of the shaft, as previously mentioned, is formed with a splined end 74 to enter complementary slots in the gear 64. The gear 64 is formed with a hub portion 76 which is suitably journalled in ballbearing member 78 located in a suitable journal 80 in the housing 24. A dirt and oil seal 82 is also provided in the journal 80 to prevent sawdust or any other sediment thrown out by the saw from entering the bearing 78 or any other portion of the interior of the housing 24. A suitable seal member 84 performs the same function to protect the bearing member 70.

The gear 64 may be suitably connected to a pilot shaft 86 which is aligned with the driveshaft 66, and provides rigidity for the same. The shaft 86 may be formed with a flange 88 through which the rivets 90 connect the same to the gear 64, and may have its opposite end positioned in a suitable ballbearing member 92 located in a suitable socket 94 in a sleeve member 96 mounted in the upper open end 98 of the housing 24. A suitable cover member 100, fastened through the sleeve and to the housing 24 by suitable screw members 102, effectively prevents dust or any other sediment from entering the housing from this direction. As an additional precaution to preventing the entrance of dust or sediment to the gear housing, I provide the packing member 104 at the bearing member 92.

The housing 24, as thus described, completely encloses the driving connections between the flexible shaft 26 and the sprocket 20 about which the saw chain 18 is trained. The housing is also provided with the handle portions 106 and 108 extending upward and below the sprocket wheel. The housing 24 is adapted to be connected to the frame guide 16 by means of the bolt members 110 which pass through the elongated slots 112.

A chain adjusting device is provided for the purpose of moving the housing 24 and associated parts in the event the chain becomes slack and it is necessary to draw up on the same. This is accomplished by means of a collar 114 mounted upon a jam member 116 that has a lip 118 extending into a suitable groove 120 in the edge of the saw frame. The jam member 116 has a threaded bolt portion 122 which extends through and screw-threadedly engages the collar 114. Thus, by turning the collar 114 in its position against the edge of the frame sections 124, and with the bolts 110 untightened in the elongated slots 112, there will be a direct breach widening movement between the saw frame 16 and the housing 24. In this manner the entire housing is moved toward or away from the frame, thus tightening or loosening the slack in the saw chain.

A suitable chain guard 126 may be fastened to the handle portion 108 by means of a bolt member 128 and extend from a saddle 130 at one end of the housing 24 to a point engaging the oil tank on the bracket 14.

Referring now to Figs. 3A, 6 and 7, the bracket 14 may be connected to the saw frame 16 by a pair of bolt members 132 which may be connected with the arms 134 and 136 on the bracket 14 and extend through similar elongated slots 112'. The bracket 14 may be formed with a pair of journals 138 for end bearings 140 of an idler shaft 142 upon which the idler sprocket 22 is mounted. The bracket may be further formed with the arm members 144 extending downwardly on both sides thereof and the arms 146 extending upwardly therefrom. The arms provide a support for the parallel rod members 148 which extend forward to support the brackets 134 and 136, and rearward to support the handle bracket 150. An elongated handle member 152 is secured in a suitable socket in the handle 150 by a thumb screw fastener member 154 and is capable of being rigidly locked in position either in the plane of the saw frame 16 or at right angles thereto.

The frame 14 upon the arms 146 is adapted to support an oil reservoir 156 secured thereto by suitable angle iron members 158. I provide an oil conduit 160 extending from the tank 156 to a pump housing 162 within which a plunger 164 is slidably mounted, being normally held in an outward position by a coiled spring member 166 positioned in the cylinder 168. The plunger 164 is thus yieldingly pressed against an eccentric 170 on the idler shaft 142 and is capable of reciprocatory movement whenever the shaft is rotating. Thus, whenever the saw is operating, an effective, positively acting reciprocating pump is provided for pumping oil from the reservoir 156 through the oil conduit 172. A spring-pressed check valve 174, mounted in the end of pump housing 162, prevents the return of any oil after it has been pumped into the conduit 172.

The conduit 172 is preferably copper tubing, or some similar substance capable of slight distortion, so that in the event the housing 14 is moved away from or closer to the saw frame 16, the lubricating system will not be affected. In connection with this arrangement, the conduit 172 is provided with an elbow 176 that is screw-threadedly mounted in an opening 178 which communicates with an elongated chamber 180 within the saw frame 16.

Referring to Figs. 8 and 9, the saw frame 16 may be formed in three sections, the outer sections 16a and 16b, and an inner section 16c. The outer sections are identical in shape and size and the inner section is formed with its outer edges 16d extending beyond the outer sections to form a track for the saw chain, as will presently be apparent.

The inner section 16c is formed with a large rectangular cavity 16e which is adapted to be filled with cotton waste or other absorbent A, so that when oil from the pump is forced into the cavity the same will gradually saturate the waste and regulate the flow of the oil to the chain tracks.

The central section 16c of the chain frame is further provided with the diagonally extending grooves 16f upon one face thereof, which are adapted to communicate with the chain tracks around the edges of the same. In this manner it can be seen that as the saw is operating, with each rotation of the sprocket 22 oil will be pumped into the chamber 16e in the saw frame and through the diagonal slots 16f. The oil will gradually be forced outwardly on the chain track, thus providing at all times an effective lubrication of the chain track.

Each of the sprocket wheels 20 and 22 are formed with combined side link supports and fan elements 21 and 23 which extend to opposite sides of the sprockets. In view of the thickness of the sprocket wheels these members can be pressed outwardly to opposite sides of the same, out of the metal from which the sprocket wheels are made.

In operation, as the saw chain is carried about the sprocket by the teeth 25, the inner edges of the chain will rest upon the edges of the members 23 and 21 and at the same time, due to the speed with which the sprocket wheels will be rotating, the vanes 23 and 21 will serve as fan members to blow the sawdust and other sediment away from the side of the saw, thus preventing the same from settling on the brackets, and also blowing the same away from the operators.

The chain saw 18, previously mentioned and shown in detail in Figs. 10 to 14 respectively, may be constructed of a plurality of connected sets of drag links 182 and side links 184. Each of the drag links 182 is formed with a flat, thin body portion 186, a pair of downwardly extending ear portions 188 and 190 upon opposite ends thereof, and facing chisel portions 192 and 194 on the extended upper ends of the body portions. The chisel portions 192 and 194 are of sufficient thickness to extend upon both sides of the other sections of the drag link. Each of the ears 188 and 190 are formed with the drilled openings 196 and 198 through which the pins 199 extend.

The side links 184 are formed with a flat bottom wall 200, a comparatively rectangular body portion 202, and an outwardly and upwardly extending arm 204 formed in its perpendicular portion with a triangular pointed end 206. The end 206 is adapted to be formed with knife edges 208, 210, upon its angular sides. I provide the drilled openings 212, 214 and 216 through the body portion 202 of the link.

In assembling together the drag links and the side links, it will be noted (see Fig. 5), that the drag links 184 are connected together upon the pin 198 and also through the drilled opening 214 to a pair of the drag links 182. The side links are identical in shape but are reversed in position so that lefts and rights are provided upon opposite sides of the drag links. In this manner the drag links are connected together and to side links upon each side upon pins that extend through the opening 214, and the side links are connected together upon opposite sides of the drag links upon the pins 220 and 222 that are mounted in the openings 212 and 216 respectively. To thus connect the side links upon the sides of the drag links will leave considerable space between the same and accordingly applicant provides the rollers 224 upon each of the pins 220 and 222. It is these rollers which are contacted by the teeth 25 of the sprocket wheels as they revolve and carry the chain forward about the sprocket wheels. In movement of the chain thus formed about the sprocket wheels, it will be noted that the lower edge 200 of the side links 184 rests upon the edge of the vanes 21 and 23 and also upon the peripheral edges 226 and 228 of the frame members 16a and 16b. It is thus apparent that throughout the travel of the chain the most effective means for driving the chain has been provided as well as a support for the chain at the points where the least amount of friction would obtain. The rollers 224 are preferably steel case hardened rollers which obviously are capable of considerable wear, and the lower edge 200 of the side links is "finished" so that a smooth riding surface is provided for engagement with the tracks 226 and 228.

From the above description of the chain 18, it will be obvious that the assembly of the same is simple and yet when the same is assembled together an unusual strong chain has been provided. The chain, as hereinbefore explained, travels over the tracks in saw guide 16 which are lubricated as heretofore explained. It is also trained about the sprockets 20 and 22 that are mounted in the brackets on the opposite ends of the saw.

As hereinbefore mentioned, one of the features of this invention resides in the fact that I provide a centrifugal clutch mechanism 30 at the engine 28 which is adapted to slip when the load becomes too great or the saw jams. This clutch will at all times protect the saw mechanism and prevent breakage which might occur under unusual circumstances.

I have also described a throttle handle 32 connected with a speed control or governor on the engine and mounted on the flexible shaft adjacent the tubular extension 30 at the housing 24.

It is sometimes desirable to have a clutch capable of manual manipulation. For this purpose, in Figs. 16 and 17, I have shown a clutch member 240 screw-threadedly mounted on the rigid sleeve member 34 attached to the transmission housing 24. The clutch may be of a well known type at present on the market, and may include the rigid shaft member 242 provided with the splined tip 244 for engagement with the shaft 58 in the transmission housing.

The shaft 242 may be mounted in suitable bearings 246 in a clutch housing 248 and be provided with a cup-shaped end 250 within which the usual disc plate clutch members 252 are mounted and connected for rotation. I provide the sliding clutch plates 254 mounted between the clutch plates 252; the plates 254 being keyed to a driveshaft 256 mounted in the ballbearing members 258 and 260 in the housing 248, and a sleeve member 262 screw-threadedly connected thereto. The shaft 256 may be provided with an axial opening 264 and a drive nut 266 to receive the splined tip of the flexible driveshaft 26.

The control ring 268 may be telescopically mounted upon the clutch housing 248 and be provided with a pair of inwardly projecting stud members 270 that engage in suitable openings 272 in split thrust ring portions 274 and 276. These split thrust rings are connected together by the pin members 278. The thrust ring may be positioned in the groove 280 in the clutch shifter member 282 which, upon being thrust forward, bears against the ball 284 to press the clutch plates 252 and 254 together through the usual mechanism provided for this purpose.

With the construction shown in Figs. 15, 16 and 17, it will thus be seen that applicant has provided a combination wherein a friction clutch is provided at the engine capable of disengaging under unusual strain. It also will be seen that a hand clutch or manually operated clutch is provided adjacent the saw so that an operator remote from the engine can engage or disengage the saw according to the work at hand.

In the preferred construction of my improved saw combination, I provide a portable carriage 290 upon which the engine 28 may be mounted in a swiveling manner so that the carriage can be transported to the vicinity of the work and the flexible shaft can extend to where the work is taking place. The carriage 290 may be provided with the usual lifting handles 292 and the barrel wheel 294 so that the same is easily transportable.

From the above and foregoing description it will be apparent to those skilled in the art that I have provided a highly efficient chain saw and drive therefor. It will be obvious that the entire assembly, including the flexible shaft and the portable saw, may be supported upon the carriage 290 together with the portable engine and moved about by a single operator. It will be apparent also that by the use of either the manual clutch or the centrifugal clutch at the engine, a highly satisfactory saw and operating mechanism has been provided.

While I have illustrated and described a specific embodiment of the invention, it will be apparent to those skilled in the art that changes and modifications may be made in the exact details shown, and I do not wish to limit myself in any particular. Rather, what I desire to secure and protect by Letters Patent of the United States is:

In a sewing machine, a portable gasoline engine having a throttle, a flexible shaft having a driving connection at one end with said engine, a flexible housing enclosing said shaft and attached at one end to said engine, a saw frame having a rigid hollow handle attached to the other end of said housing, sprockets journalled on the respective ends of said frame, one of said sprockets being drivingly connected with the other end of said flexible shaft, a saw chain trained about said sprockets, a control sleeve encircling said handle and slidable thereon near the end thereof attached to said flexible housing, and a flexible control cable attached at one end to said control sleeve and at its other end to said throttle for operating the same when said sleeve is moved longitudinally of said handle, said control cable being associated with said flexible housing throughout its length and supported and guided thereby.

ARTHUR WILLIAM MALL.

CERTIFICATE OF CORRECTION.

Patent No. 2,184,461.                                                                December 26, 1939.

ARTHUR WILLIAM MALL.

It is hereby certified that error appears in the printed specification of the above numbered patent requiring correction as follows: Page 4, second column, line 21, in the claim, for the word "sewing" read sawing; and that the said Letters Patent should be read with this correction therein that the same may conform to the record of the case in the Patent Office.

Signed and sealed this 19th day of March, A. D. 1940.

(Seal)

Henry Van Arsdale,
Acting Commissioner of Patents.